United States Patent Office 3,389,178
Patented June 18, 1968

3,389,178
AMINE OXIDE BLENDS
Robert R. Fields, Nitro, and Erich Tobler, Charleston, W. Va., assignors to Union Carbide Corporation, a corporation of New York
No Drawing. Filed Sept. 10, 1964, Ser. No. 395,550
2 Claims. (Cl. 260—583)

ABSTRACT OF THE DISCLOSURE

Blends of random-higher-alkyl di(lower-alkyl)amine oxides. These blends are useful in detergent formulations.

This invention relates to blends of tertiary amine oxides. More particularly, this invention is concerned with blends of higher-alkyl di(lower-alkyl)amine oxides and their use in detergent formulations.

In recent years certain tertiary amine oxides have gained considerable currency as a component in detergent formulations, either as a cleaning agent or as a foam booster. See, for example, U.S. Patent Nos. 2,999,068; 3,001,945; 3,085,982; and 3,086,943; Canadian Patent No. 639,398; and Belgian Patent No. 603,337. The amine oxides presently employed are generally derived from natural sources, such as coconut oil. For example, coconut oil is subjected to a hydrogenolysis to produce a mixture of higher alcohols, which is 65 to 70 percent $C_{12}$ and $C_{14}$ alcohols. This mixture is then reacted with a di(lower-alkyl)amine, such as dimethylamine, to produce a higher-alkyl di(lower-alkyl)amine. The tertiary amine is then oxidized with aqueous hydrogen peroxide to form the amine oxide.

Because of the high cost of the amine oxides derived from natural sources, it would be desirable to have a synthetic source of the higher-alkyl group. One such source are the "Alfol" alcohols which are produced by the reaction of aluminum triethyl with ethylene to produce an aluminum trialkyl compound followed by air oxidation and hydrolysis of the resulting aluminum trialkoxide compounds. This source, like the natural sources, provides a mixture of primary alcohols having an even number of carbon atoms in the chain and, although some control over chain length distribution is possible, it is not as precise as might be desired. Moreover, it has been found that the mixed amine oxides produced from alcohol mixtures of this type have somewhat poorer properties than the pure amine oxides, as is shown in Table I below:

TABLE I

| Amine Oxide | Foam Stability, Number of Plates | Percent Soil Removal |
|---|---|---|
| 1-dodecyldimethylamine oxide | 32 | 49.3 |
| "Ammonyx LO" [1] | 29.5 | 48.7 |

[1] The trademark of a commercially-available "lauryl dimethylamine oxide" containing 62 percent dodecyldimethylamine oxide, 29 percent tetradecyldimethylamine oxide, and 8 percent hexadecyldimethylamine oxide.

A second potential synthetic source for higher-alkyl di(lower-alkyl)amine oxides are n-alkyl chlorides produced by the chlorination of n-paraffins. The alkyl chloride product comprises less than about 15 percent 1-alkyl chlorides, with the balance being a random mixture of all possible secondary chlorides. These alkyl chlorides can be reacted with a di(lower-alkyl)amine to produce a tertiary amine, which can be converted to the amine oxide. Although this source permits for the first time a commercially-feasible method of obtaining amine oxides of a single molecular weight, it has been found that these "random-higher-alkyl di(lower-alkyl)amine oxides" have considerably poorer properties than the individual primary higher-alkyl di(lower-alkyl)amine oxides, as is shown in Table II:

TABLE II

| Amine Oxide | Foam Stability | Percent Soil Removal |
|---|---|---|
| 1-dodecyldimethylamine oxide | 32 | 49.3 |
| Random dodecyldimethylamine oxide | 15 | 46.7 |

It has been further found that these random amine oxides have poorer properties than the individual secondary isomers, as is indicated by the data set forth in Table III below:

TABLE III

Alkyl dimethylamine oxide:                    Foam stability
    2-undecyldimethylamine oxide _____ 17
    6-undecyldimethylamine oxide _____ 17
    Random undecyldimethylamine oxide _____ 14.5

It has been unexpectedly and surprisingly found by this invention, however, that blends of random-straight-chain-higher-alkyl di(lower-alkyl)amine oxides, instead of having poorer properties than the individual components, as is the case with the terminal alkyl materials, have improved properties, which, in many cases, are superior to the properties of any one of the ingredients.

The higher-alkyl di(lower-alkyl)amine oxides employed in accordance with this invention are referred to herein as "random-higher-alkyl di(lower-alkyl)amine oxides," and are represented by the formula:

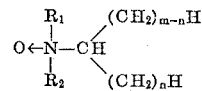

wherein $R_1$ and $R_2$ each are alkyl of from 1 to 3 carbon atoms, and are preferably methyl; $m$ is an integer having a value of from 7 to 17; and $n$ is an integer having a value of from 0 to $m./2$, with the proviso that, although for each amine oxide of a single chain length (or carbon number) $m$ is a single integer, $n$ represents all possible values. That is, if $m$ is 7, $n$ is 0, 1, 2, and 3; if $m$ is 8, $n$ is 0, 1, 2, 3, and 4; et cetera. Thus, the formula represents a mixture of all isomers of a specific molecular weight. Particularly preferred amine oxides are those containing less than 15, preferably less than 10 percent, of terminal-higher-alkyl groups, i.e., for each value of $m$, the incidence of $n=0$ is less than 15 percent, with the balance being a random distribution of the secondary isomers.

The random-higher-alkyl di(lower-alkyl)amine oxides are employed in blends of at least two different chain lengths or carbon numbers, with no homolog being present in an amount greater than 95 percent, and preferably not greater than 60 percent. Preferred amine oxide blends are those composed of amine oxides having random-higher-alkyl groups in the range of from 12 to 16 carbon atoms, inclusive, in such proportion that the average chain length has a value, which may be fractional, in the range of from about 13 to about 15 carbons, inclusive.

The random-higher-alkyl di(lower-alkyl)amine oxide blends are readily prepared by known techniques. As indicated above, one suitable route is via halogenation of an n-paraffin, reaction of the resulting alkyl halide with a di(lower-alkyl)amine and oxidation of the resulting tertiary amine with hydrogen peroxide.

The halogenation can be effected by any suitable technique, such as by a non-catalytic thermal reaction or a peroxide- or light-initiated reaction of halogen, e.g. chlorine, with a paraffin. Although branched-chain paraffins can be employed, normal paraffins are preferred to minimize the amount of terminal alkyl chlorides in the product. In general, halogenation should not be carried beyond a depth of about 20 to 25 percent, i.e., beyond a conversion of 20 to 25 percent of the alkane charged to alkyl halide. If a greater depth of halogenation than this is permitted the yield of polyhalides is too high for economically desirable efficiencies.

The alkyl halide, with or without intermediate purification, is then reacted with a di(lower-alkyl)amine, such as dimethyl-, diethyl- or dipropylamine, to produce a random-higher-alkyl di(lower)amine. This general reaction is well known, and can be effected at about 150° C. to about 250° C., employing a molar ratio of di(lower-alkyl)amine to random-higher-alkyl halide in the range of from about 1:1 or lower to about 25:1 or higher. Because the secondary alkyl chlorides are sterically hindered, they react very slowly with the amine. Thus, it is preferred to conduct the reaction in the presence of from about 3 to about 25 moles of a lower alkanol, such as ethanol, per mole of alkyl chloride to increase the reaction rate. In addition, the alkanol suppresses dehydrohalogenation of the secondary halide. This improved process is the subject of application Ser. No. 395,576, filed Sept. 10, 1964, by G. W. Borden and D. E. Battin.

The tertiary amine is isolated by conventional techniques, for example, extraction with hydrochloric acid, neutralization with sodium hydroxide and distillation. The isolated amine is then converted to its oxide by known techniques. One suitable technique comprises reaction with aqueous hydrogen peroxide. In this process, from about 5 to about 50 percent excess of hydrogen peroxide in 5 to 70 percent aqueous solution is reacted with the amine at a temperature of about 20° C. to about 70° C. The random amines, like the alkyl chlorides, are sterically hindered and, therefore, react more slowly than terminal-higher-alkyl di(lower-alkyl)amines. Accordingly, it is preferred to effect the oxidation in the presence of from about 0.5 to about 15 moles of a lower alkanol per mole of amine to promote the reaction rate. This improvement is the subject of application Ser. No. 395,421, filed Sept. 10, 1964, by Erich Tobler now abandoned.

The amine oxide can be isolated from this reaction mixture, if desired. However when the reaction has been carried to essential completion, i.e., at least about 90 to 95 percent conversion of amine to oxide, and the amount of water has been properly selected, no purification is necessary and the reaction product may be employed directly in a detergent formulation.

Each step of the reaction can be conducted on a single carbon number material or a mixture, as desired, for little or no difference in properties of the ultimate blend is observed in the product obtained by blending amine oxides or by amine oxides produced from blends of amines, alkyl halides or paraffins.

The blends of this invention can be employed as foam boosters in combination with one or more anionic surface active compounds, such as alkyl benzene sulfonates, alkyl sulfates, sulfates of ethylene oxide adducts of long chain alcohols or alkyl phenols, alkyl glyceryl ether sulfonate salts and the like, or they can be employed as the primary surface active agent in combination with one or more of the above-indicated surfactants. Compositions of this type have been disclosed in U.S. Patent No. 2,999,068; U.S. Patent No. 3,001,945; U.S. Patent No. 3,085,982; U.S. Patent No. 3,086,943; Canadian Patent No. 639,398; and Belgian Patent No. 603,337.

The compositions wherein the amine oxide is employed as a foam booster generally comprise an aqueous medium containing from about 3 to about 20 weight percent synthetic anionic surface active compound and from about 1 to about 15 weight percent of amine oxide. The compositions may also contain builders and various other modifiers known to the art.

The following examples are illustrative. In the examples the following tests were employed to evaluate the products as foam boosters or detergents.

A. FOAM STABILITY (1) Test formulation.—80 weight percent of sodium lauryl alcohol which had been reacted with from 3 to 4 ethoxy groups, and sold commercially and 20 weight percent alkyl dimethyl amine oxide diluted with water to 0.05 weight percent combined sulfate and oxide in the test detergent.

(2) Test method.—Clean 9-inch diameter dinner plates were evenly coated with 2.5 grams of a mixture of 50% vegetable shortening, 50% flour and a trace of a red dye which had been aged for from 20 minutes to one week and then heated at 100–120° F. prior to application. After aging for one hour, the soiled plates were then washed in a test solution prepared by dissolving the test formulation in one liter of water of the desired hardness at 115° F., transferring the solution to a dishpan, adding 3 liters of water which had been heated to 100–120° F. through a funnel at a height of 24 inches and allowing the resulting mixture to stand for 30 seconds. Two plates were placed in the dishpan and washed with a dishcloth, then a second two plates were washed in a similar manner. Washing was continued until a layer of suds is visible over only ½ of the area of the dishpan. The number of plates washed to this point is indicative of the foam stability of the test formulation. Results are reported as the average of two runs. See Test Method A of "A Tentative Method of Estimation of Foam of Liquid Detergents for Hand Dishwashing," J. C. Harris, Proc. of 45th Ann. Mtg. of C.S.M.A., Dec. 8–10, 1958.

B. PERCENT SOIL REMOVAL (1) Test formulation.—20 weight percent amine oxide; 50 weight percent sodium tripolyphosphate; 22.5 weight percent sodium sulfate; 6 weight percent sodium silicate; 1 weight percent sodium chloride and 0.5 weight percent sodium carboxymethyl cellulose diluted with water to 0.025 weight percent of the above formulation in the test detergent.

(2) Test method.—Four 4-inch by 4-inch standard EMPA soiled cloth swatches were washed on a Terg-O-Tometer, employing 1000 ml. of 150 p.p.m. hardness water with 0.2 percent by weight of the test formulation, for 15 minutes at 120° F. and 100 r.p.m. Each swatch was rinsed by hand-squeezing four times in each of two beakers containing 500 ml. distilled water at 120° F. and dried by ironing. Percent soil removal was determined from the reflectances of unsoiled cloth and washed and unwashed samples of the soiled cloth by the following equation:

$$\text{percent } SR = \frac{R_x - R_y}{R_z - R_y} \times 100$$

wherein
Percent SR=Percent soil removal
$R_x$=Reflectance of soiled swatch after washing
$R_y$=Reflectance of soiled swatch before washing
$R_z$=Reflectance of unsoiled cloth.

Example 1

Amine oxides having random-higher-alkyl groups of various chain lengths were produced by the thermal chlorination of a normal paraffin of a single chain length to a depth of about 25 percent to obtain a solution of 25 percent random alkyl chloride in paraffins. After distillation of the reaction product to remove unreacted paraffin and polychlorides, the alkyl chloride was reacted with dimethylamine to produce a random-higher-alkyl dimethyl amine. After extraction from the reaction mixture with hydrochloric acid, neutralization with sodium hydroxide and purification by distillation, the tertiary amine was reacted with aqueous hydrogen peroxide. The resulting aqueous amine oxide solutions were then employed to prepare the test formulations.

The results obtained from the tests on the single carbon number samples are summarized in Table IV.

TABLE IV.—EVALUATION OF RANDOM-HIGHER-ALKYL DIMETHYL AMINE OXIDES

| Alkyl group, Number of Carbon Atoms | Foam Stability | | Percent Soil Removal |
|---|---|---|---|
| | 50 p.p.m. | 150 p.p.m. | |
| 11 | | | 36.9 |
| 12 | 15 | 15.5 | 46.7 |
| 13 | 20.5 | 21.5 | 48.7 |
| 14 | 22 | 22.5 | 48.6 |
| 15 | 21 | 20.5 | 54.3 |
| 16 | 14.5 | 13 | 44.7 |
| 18 | 8.5 | 8 | 52.4 |

From Table IV it can be seen that foam stability is optimum for individual random-higher-alkyl dimethyl amine oxides wherein the higher-alkyl group contains from 13 to 15 carbons, whereas detergency is relatively constant when the higher-alkyl group contains from 13 to 18 carbons.

Blends of these amine oxides were also prepared and evaluated. The results obtained from these evaluations are summarized in Table V.

TABLE V.—EVALUATION OF AMINE OXIDE BLENDS

| Run No. | Higher Alkyl Group | | Foam Stability | | Percent Soil Removal |
|---|---|---|---|---|---|
| | Chain Length Distribution | Average Chain Length | 50 p.p.m. | 150 p.p.m. | |
| 1 | 50% $C_{13}$, 50% $C_{15}$ | 14 | 27 | 30 | |
| 2 | 25% $C_{13}$, 75% $C_{14}$ | 13.8 | 28.5 | 29.5 | |
| 3 | 75% $C_{14}$, 25% $C_{15}$ | 14.3 | 28 | 30.5 | |
| 4 | 33.3% $C_{11}$, 33.3% $C_{12}$, 33.3% $C_{13}$ | 12 | | | 51.3 |
| 5 | 25% $C_{13}$, 50% $C_{14}$, 25% $C_{15}$ | 14 | 28 | 27 | |
| 6 | 33.3% $C_{13}$, 33.3% $C_{14}$, 33.3% $C_{15}$ | 14 | 27.5 | 28 | 54.7 |
| 7 | 10% $C_{12}$, 20% $C_{13}$, 40% $C_{14}$, 20% $C_{15}$, 10% $C_{16}$ | 14 | 25 | 23.5 | |
| 8 | 5% $C_{12}$, 25% $C_{13}$, 40% $C_{14}$, 25% $C_{15}$, 5% $C_{16}$ | 14 | 23.5 | 24.5 | |
| 9 | 60% $C_{12}$, 30% $C_{14}$, 10% $C_{16}$ | 13 | 26 | 30.5 | 54.5 |
| 10 | 30% $C_{12}$, 60% $C_{14}$, 10% $C_{16}$ | 13.6 | 23.5 | 27.5 | |
| 11 | 50% $C_{12}$, 25% $C_{14}$, 15% $C_{16}$, 10% $C_{18}$ | 13.7 | 20.5 | 20.5 | |
| 12 | 20% $C_{14}$, 30% $C_{16}$, 50% $C_{18}$ | 16.6 | 14.5 | 14.5 | |

As can be seen from the data presented in Tables IV and V, the blends of at least two different carbon number amine oxides exhibit higher values for foam stability and percent reflectance than would be expected from the values of the individual random-higher-alkyl dimethyl amine oxides. This is particularly true for the blends of Runs 1–10, whose foam stabilities were better than that for any single component. Foam stability was adversely affected, however, by the presence of $C_{18}$ higher alkyl dimethyl amine oxide, as is illustrated by Runs 11 and 12. Nevertheless, even these blends had foam stabilities which were above the values which would be expected by averaging the foam stabilities of the component random-higher-alkyl dimethyl amine oxides in proportion to their concentration in the blend. These calculated average values are summarized in Table VI, below, together with the found values, for purposes of comparison.

TABLE VI.—COMPARISON OF CALCULATED AND ACTUAL FOAM STABILITIES OF AMINE OXIDE BLENDS

| Run No. | 50 p.p.m. | | | 150 p.p.m. | | |
|---|---|---|---|---|---|---|
| | Calculated | Found | Percent Increase | Calculated | Found | Percent Increase |
| 1 | 20.8 | 27 | 30 | 21 | 30 | 30 |
| 2 | 21.6 | 28.5 | 32 | 22.3 | 29.5 | 32 |
| 3 | 21.8 | 28 | 31 | 22 | 30.5 | 39 |
| 5 | 21.4 | 28 | 31 | 21.7 | 27 | 24 |
| 6 | 21.2 | 27.5 | 30 | 21.5 | 28 | 30 |
| 7 | 20.1 | 25 | 24 | 20.3 | 23.5 | 16 |
| 8 | 20.6 | 23.5 | 14 | 20.9 | 24.5 | 17 |
| 9 | 17.1 | 16 | 52 | 17.4 | 30.5 | 75 |
| 10 | 19.2 | 23.5 | 22 | 19.5 | 27.5 | 41 |
| 11 | 16.0 | 20.5 | 28 | 16.1 | 20.5 | 27 |
| 12 | 13.0 | 14.5 | 11 | 12.4 | 14.5 | 17 |

As is readily seen from Table VI, the blends all have considerably better foam stability than that which would be predicted based upon the individual carbon-number amine oxides. Similar results are seen for detergency, as set forth in Table VII.

TABLE VII.—COMPARISON OF CALCULATED AND ACTUAL DETERGENCIES OF AMINE OXIDE BLENDS

| Run No. | Percent Soil Removal | | Percent Increase |
|---|---|---|---|
| | Calculated | Found | |
| 4 | 44.1 | 51.3 | 16 |
| 6 | 50.5 | 54.7 | 8 |
| 9 | 47.1 | 54.5 | 16 |

Example 2

Employing apparatus and procedures similar to those described in Example 1, except that the amine oxide blend was produced by the reaction of a blend of amines with hydrogen peroxide, an amine oxide wherein the higher alkyl group was 25% $C_{13}$, 50% $C_{14}$, and 25% $C_{15}$ was prepared and evaluated as a foam booster. The foam stability at 50 p.p.m. was 29.5 plates and at 150 p.p.m. was 29 plates, which compares favorably with the results obtained by the blend obtained by mixing the amine oxides (Example 1, Run 5).

What is claimed is:

1. As a composition of matter, a mixture of at least two random-higher-alkyl di(lower-alkyl)amine oxides, each oxide being present in an amount which is not greater than 95 weight percent of said blend and having the formula

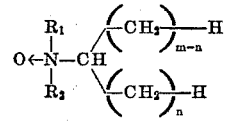

wherein $R_1$ and $R_2$ each are alkyl of from 1 to 3 carbons; $m$ is an integer having a value of from 7 to 17, inclusive; and $n$ is an integer having a value of from 0 to $m./2$, inclusive, with the proviso that for each value of $m$, $n$ represents all possible values in the range of 0 to $m./2$ and the further proviso that the incidence of $n$ being 0 is less than 15 percent.

2. The composition as claimed in claim 1 wherein $m$ has a value of from 11 to 15, inclusive, and the average value of $m$ is in the range of from 12 to 15, inclusive.

References Cited

UNITED STATES PATENTS 3,270,060   8/1966   Wakeman et al. _____ 260—583

OTHER REFERENCES

Schwartz, et al., Surface Active Agents and Detergents, Interscience Publishers, New York, 1958, p. 516, TP 14953.

Moilliet et al., Surface Activity, D. Van Nostrand, Princeton, N.J., 1961, p. 300, TP 149 M6.

CHARLES B. PARKER, *Primary Examiner.*

R. L. RAYMOND, *Assistant Examiner.*